R. N. WOODMAN.
AUTOMOBILE REAR SIGNAL.
APPLICATION FILED JULY 15, 1916.
1,273,973.
Patented July 30, 1918.
4 SHEETS—SHEET 2.
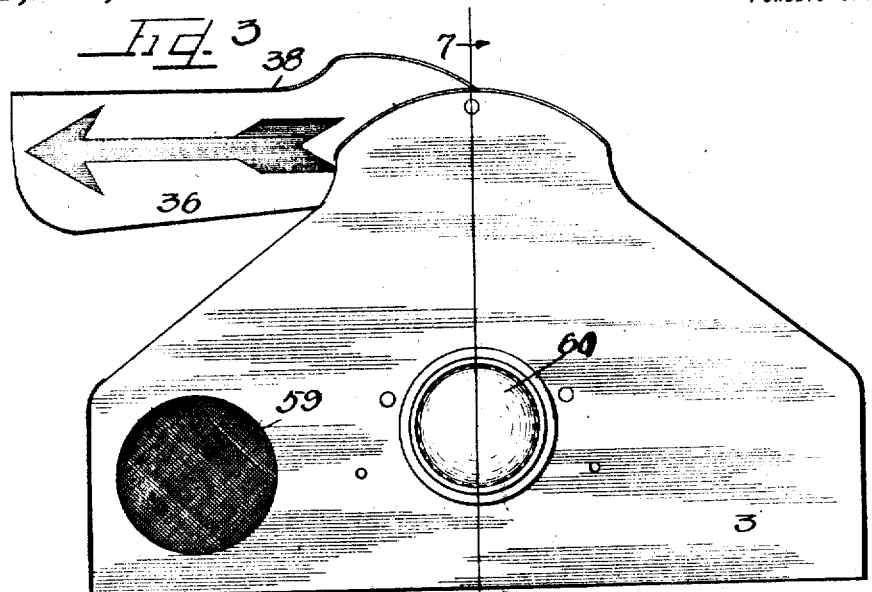
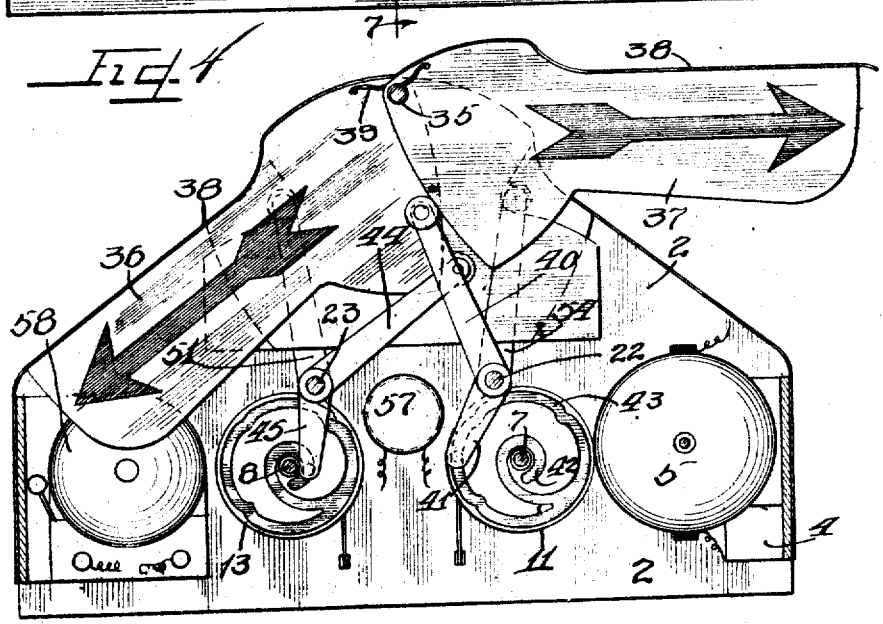

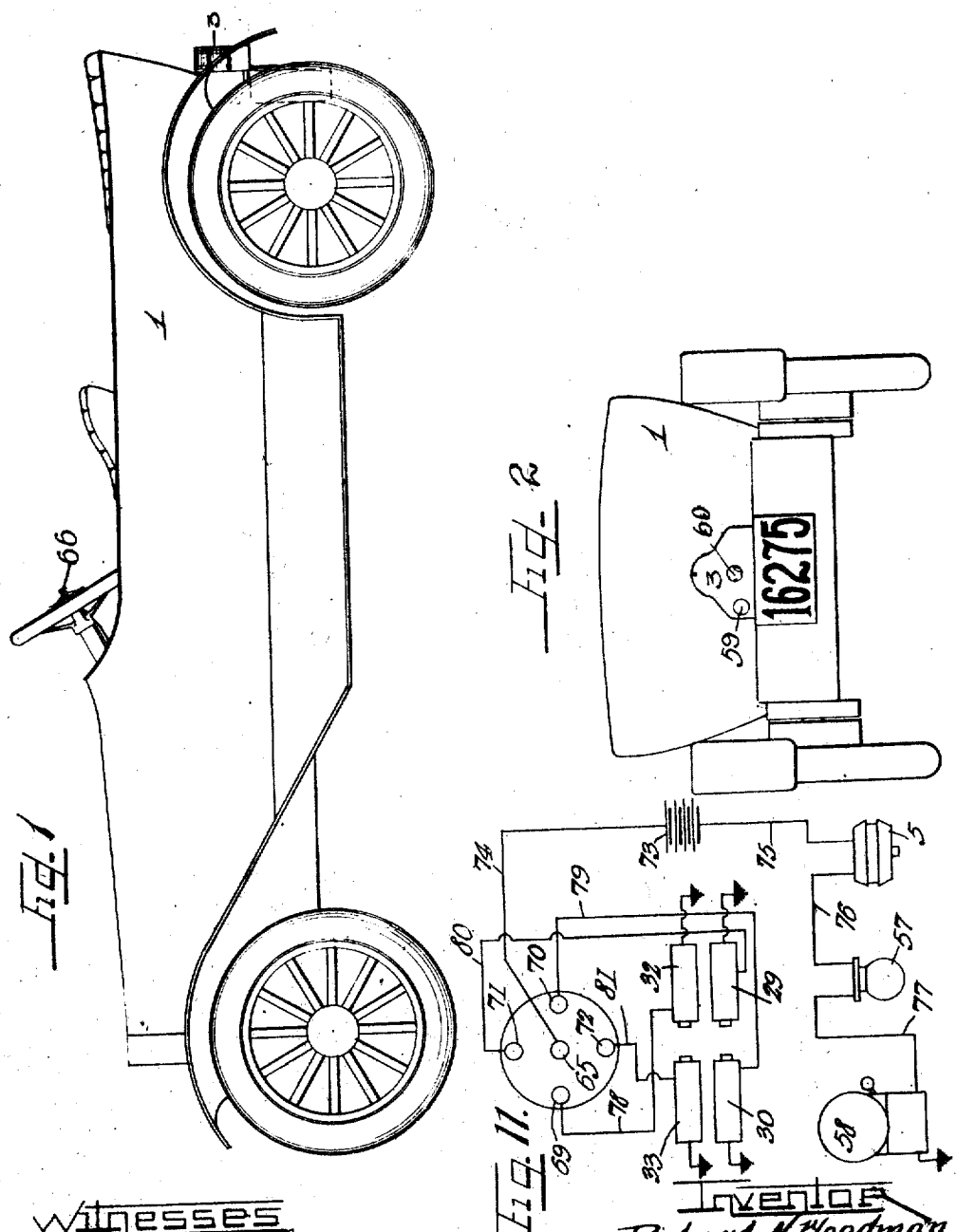

R. N. WOODMAN.
AUTOMOBILE REAR SIGNAL.
APPLICATION FILED JULY 15, 1916.
1,273,973.
Patented July 30, 1918.
4 SHEETS—SHEET 3.
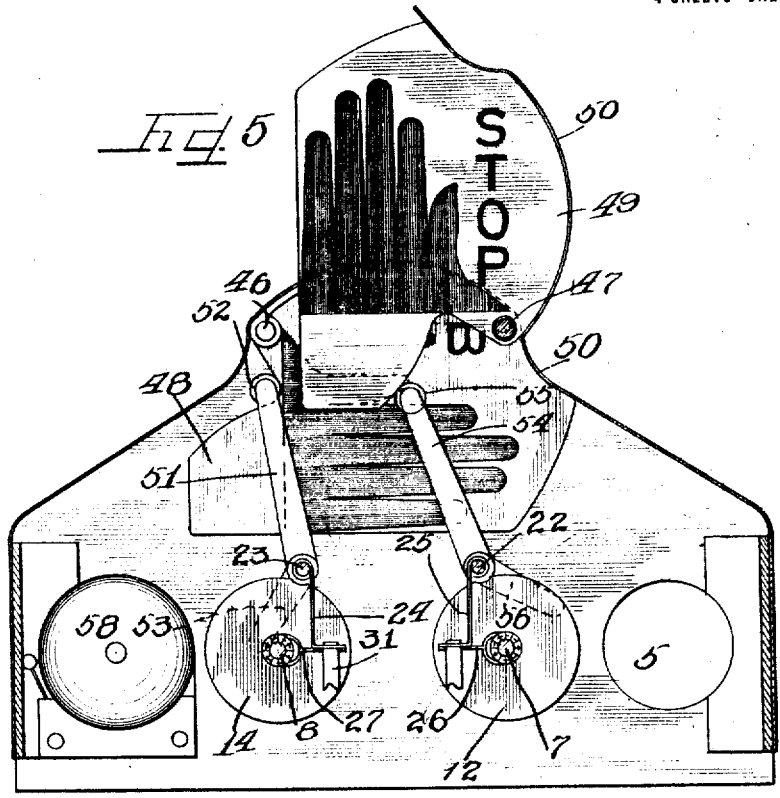
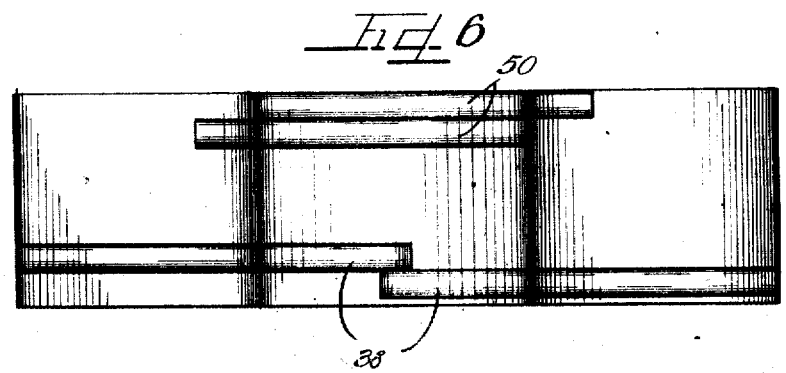
Witnesses
J. W. Angell
Charles Kelly
Inventor
Richard N. Woodman
Charles Turville
Aty.

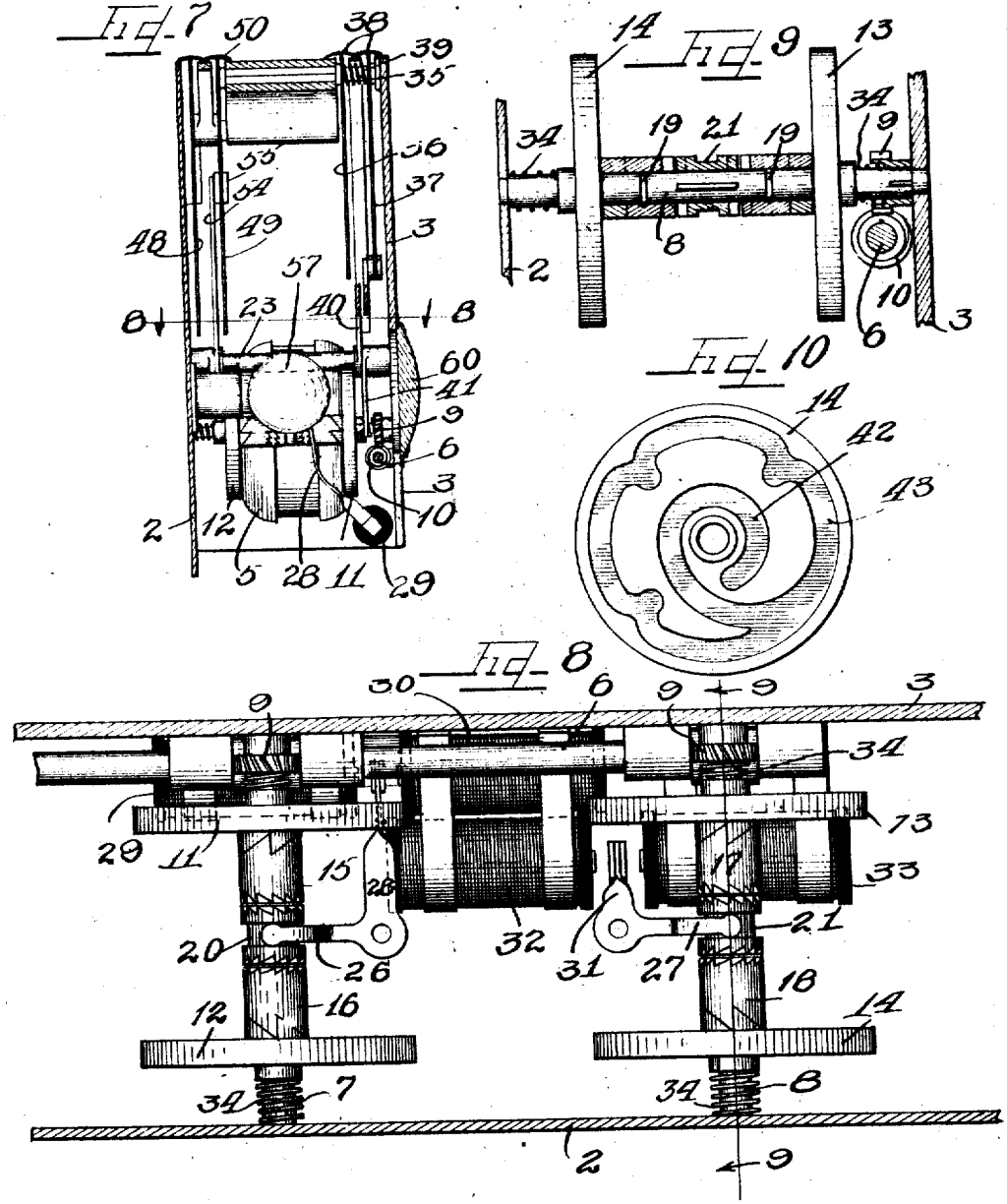

UNITED STATES PATENT OFFICE.

RICHARD N. WOODMAN, OF CHICAGO, ILLINOIS.

AUTOMOBILE REAR SIGNAL.

1,273,973.    Specification of Letters Patent.    Patented July 30, 1918.

Application filed July 15, 1916. Serial No. 109,484.

*To all whom it may concern:*

Be it known that I, RICHARD N. WOODMAN, a citizen of the United States, and a resident of the city of Chicago, in the county of Cook and State of Illinois, have invented certain new and useful Improvements in Automobile Rear Signals; and I do hereby declare that the following is a full, clear, and exact description of the same, reference being had to the accompanying drawings, and to the numerals of reference marked thereon, which form a part of this specification.

This invention relates to an improved type of rear signaling device for attachment on automobiles and other vehicles operated electrically when the proper circuit is closed to signal a right or left hand turn to be made or to indicate stopping or backing of the vehicle to drivers of other vehicles following. The device is further provided with illuminating means and with an audible alarm signal which is operated at the same time that the visible signal of the device is brought into operation. The device differs from other signaling devices heretofore placed upon the market in that the visible signaling devices are not merely swung into a stationary visible position but are swung into a visible position and thereafter actuated with an oscillating or swinging movement so as to be more noticeable and insure observance of the signal by drivers of vehicles behind.

It is an object therefore of this invention, to construct an automobile signal device attachable upon the rear end of an automobile and actuatable by suitable electric means mounted conveniently at the operating position of the driver of the vehicle so that the signaling means will be movably displayed at the rear of the automobile to indicate a turn, stop or backing movement of the vehicle as desired, to vehicles following.

It is also an object of this invention to construct a signaling device embodying means adapted to be swung into visible position, and thereafter actuated with an oscillating movement to indicate a stop, turn or backing movement of the vehicle, and accompanied by an audible alarm signal to insure observance of the signaling device by vehicles following.

It is also an object of this invention to construct an automobile rear signal embracing mechanism adapted to be swung into visible position and thereafter actuated positively in an oscillating manner by cams for the purpose suitably driven by an electric motor with an electrical selective switch mechanism mounted conveniently for the operator of the motor car to cause any one of the desired signaling mechanisms to be brought into operating position.

It is furthermore an important object of this invention to construct an automobile rear signal device embracing a plurality of separate mechanisms to indicate respectively a right or left hand turn, stop, or backing movement of the vehicle, adapted to be actuated into movable position and thereafter operated back and forth together with an audible signal and an illuminating means, illuminated whenever the signal is operated, to light up said mechanisms.

It is finally an object of this invention to construct an improved type of automobile rear signal provided with a number of separate mechanisms to indicate different movements of the vehicle on which the signal is attached, and as well equipped with an audible alarm signal as well as a visible night signal, all simultaneously operated when any of the mechanisms are caused to be moved into a moving signaling position.

The invention (in a preferred form) is illustrated in the drawings and hereinafter more fully described.

In the drawings:

Figure 1 is a side elevation of a motor car showing the rear signaling device embodying the principles of my invention.

Fig. 2 is rear elevation thereof.

Fig. 3 is an enlarged rear elevation of the signaling device detached with one of the signaling arms in signaling position.

Fig. 4 is a view similar to Fig. 3, with the cover plate detached showing the interior mechanism.

Fig. 5 is a view similar to Fig. 4, illustrating other of the signaling mechanisms forming a part of the device.

Fig. 6 is a top plan view of the device detached with all the signaling mechanisms in concealed position out of use.

Fig. 7 is a sectional detail taken on line 7—7 of Fig. 3, with parts omitted and parts shown in elevation.

Fig. 8 is a fragmentary detail section taken on line 8—8 of Fig. 7.

Fig. 9 is an enlarged sectional detail taken on line 9—9 of Fig. 8, with parts omitted.

Fig. 10 is an enlarged face view of one of the four actuating cams of the device.

Fig. 11 is a wiring diagram of the invention.

As shown in the drawings:

The motor car is denoted as a whole by the reference numeral 1, and mounted at the rear end thereof is a device embodying the principles of my invention. The device consists of a back plate 2, and a front plate 3, and secured at one end between said respective plates 2 and 3, is a bracket member 4, upon which an electric motor 5, is mounted with its shaft 6 extending horizontally between said frame plates. The shaft of the motor 5, serves to drive a horizontal shaft section journaled in a bearing mounted on the inner surface of the front wall 3, through helical or bevel gears (not shown). Journaled horizontally and transversely between the respective back and front plates 2 and 3, are shafts 7 and 8, respectively, and each is provided with a worm gear 9, meshing with a worm 10, two of which are provided on said shaft 6, for the purpose, whereby both of said shafts 7 and 8, are driven whenever the motor 5, is caused to operate.

Journaled upon the respective shafts 7 and 8, are a plurality of cam wheels, two on each shaft, those on the shaft 7, denoted by the reference numerals 11 and 12, and those on the shaft 8, denoted by the reference numerals 13 and 14, respectively. The hub portions of each of said cam wheels on the inner adjacent ends thereof, are provided with notches or teeth for co-action with clutch elements 15, 16, 17 and 18, on said respective shafts, which as shown in the typical view in Fig. 9, are prevented from longitudinal movement on said shafts by engagement of a pin or projection, one provided on each of said clutch elements, with grooves 19, in said shafts, one for each of said clutch elements.

Feathered upon each of said shafts 7 and 8, between the respective clutch elements thereon, are slidable clutch jaw members or collars 20 and 21, respectively, each having engaging teeth at each end thereof to engage with a clutch element on either side thereof. Secured transversely between the back and front frame plates 2 and 3, respectively, and disposed slightly over the said shafts 7 and 8, and inwardly from each thereof, are rods 22 and 23, respectively, and rigidly secured to a central portion of each of said rods and depending downwardly therefrom are brackets 24 and 25, respectively. Pivoted at the lower end of said respective brackets 24 and 25, are bell cranks, one arm of each of which is of yoke-shape to engage the peripheral grooved portion of the respective jaw clutch collars 20 and 21, said yoke arms being denoted respectively by the reference numerals 26 and 27.

Two solenoids are provided for actuating each of the bell cranks, one adapted to swing a crank in one direction and the other adapted to swing the crank in the opposite direction to actuate a jaw clutch member or collar in opposite directions upon the shaft on which the same is feathered. The bell crank having the yoke arm 26, is provided with a depending arm or armature bar 28, which, as clearly shown in Fig. 7, is bent toward the front plate 3, with its lower end disposed between the adjacent end of a pair of alined solenoids denoted respectively by the reference numerals 29 and 30. Similarly, the bell crank having the yoke arm 27, is provided with a downwardly bent arm 31, which forms the armature bar of two solenoids 32 and 33, respectively, said arm projecting between the adjacent ends thereof.

The respective cam wheels 11, 12, 13 and 14, are normally held thrust inwardly against the respective clutch members 15, 16, 17 and 18, by coiled springs, each of which is denoted by the reference numeral 34, said springs coiled about the shafts and bearing against the hubs of the cam wheels. Secured in the front plate 3, and projecting rearwardly and horizontally therefrom at the upper end thereof, is a pintle shaft 35, and pivoted thereon are a pair of signal arms 36 and 37, respectively, having directional arrows, as clearly shown in Fig. 4, on the surface thereof, and each adapted to be swung upwardly and oscillated back and forth in a signaling position in the position of the arm 37, shown in Fig. 4.

As clearly shown in Figs. 4 and 6, each of said signal arms 36 and 37, along its upper edge is provided with a flange or lip 38, which serves to close one of the slots in the top wall of the casing when the signal arm moves into downward position out of use as shown in Fig. 4. A coiled spring 39, is coiled about the pintle shaft 35, with one of its ends attached to the signal arm 36, and the other to the signal arm 37, as shown in Fig. 4, acting normally to hold the same downwardly in position out of use. Pivotally mounted upon the rod 22, mentioned, is a bell crank, one arm of one of which is denoted by the reference numeral 40, and at its end is provided with a roller engaging behind the edge of the tail portion of the signal arm 37, and the other arm 41, of which projects downwardly and adjacent to the cam wheel 11, and is provided with a pin, adapted to be engaged and track in a spiral groove 42, in the outer surface of said cam wheel, said groove communicating with a peripheral groove 43 in said wheel. Another bell crank is pivoted on said rod 23, and is provided with an arm 44, which at its end is provided with a roller engaging behind the inner edge of the tail portion of the signal arm 36, and the other arm 45, of said bell crank, is disposed adjacent to the cam wheel 13, and is provided with a pin at its lower end adapted to engage and track in grooves 42 and 43, provided on the outer surface of said cam wheel similar to the cam wheel 11, described.

Secured to the back plate 2, projecting perpendicularly from the front or inner surface thereof, are pintles 46 and 47, respectively, upon which signal plates 48 and 49, respectively are pivotally mounted. As clearly shown in Fig. 5, the signal plate 48, has a hand thereon to one side of which the word "Back" is lettered, and the signal plate 49, is provided with a hand to one side of which the word "Stop" is lettered. The top margins of said respective plates 48 and 49, are each provided with a flange or lip 50, adapted to close the slots in the top wall of the casing of the device when the respective signal plates are swung downwardly as in the position of the plate 48, shown in Fig. 5.

Actuating arms for said respective signal plates 48 and 49, are provided, comprising a pair of bell cranks pivotally mounted upon the transverse rods 22 and 23, one of said bell cranks mounted on the rod 23, having an arm 51, provided with a roller 52, which tracks over a curved tail portion of the plate 48, and the other arm of which is denoted by the reference numeral 53, is disposed adjacent to the cam wheel 14, and provided with a pin adapted to engage and track in the respective cam grooves 42 and 43, provided in said cam wheel exactly similar to the illustration of the cam wheel shown in Fig. 10. The bell crank pivoted upon the cross rod 22, is provided with one arm 54, having a roller 55, on the end thereof tracking over the inner end of the signal plate 49, and with another arm 56, disposed adjacent to the cam wheel 12, and provided with a pin adapted to engage and track in the grooves 42 and 43, in the outer surface of said cam wheel.

Mounted within the casing of the device upon the inner surface of the back wall plate 2, is an electric bulb 57, and at one end within said casing at the back wall 2, is an electric bell 58. A screen shield 59, is secured over an aperture in the front wall 3, in front of the electric bell 58, and a glass lens 60, is also secured in said front wall 3, directly in front of the electric bulb 57.

Mounted upon the steering wheel of the vehicle or motor car, is a control switch 66, of the type disclosed in my co-pending application for patent for a "control switch mechanism", executed and filed on even date herewith. The control switch, as shown in the wiring diagram of Fig. 11, comprises a button, pin or stud 65, having associated therewith a resilient contact member (not shown), but adapted to be moved to contact any one of a number of contact members 69, 70, 71 and 72, to establish a circuit. In the wiring circuit any suitable source of E. M. F. 73, is utilized, with one lead wire 74, therefrom leading to the pin 65, as shown in Fig. 11.

Another line wire 75, leads from the source of E. M. F. to the motor 5, and from the motor 5, a conductor 76, leads to the lamp or bulb 57, and a wire 77, leads therefrom to the electric bell alarm 58, which is grounded. Connected to the respective terminal contact members 69, 70, 71 and 72, are wires 78, 79, 80 and 81, respectively, the wire 78, leading to the solenoid 32, the wire 79, leading to the solenoid 30, the wire 80, leading to the solenoid 29 and the wire 81, leading to the solenoid 33, and each of said solenoids is grounded.

The operation takes place in the following manner. When the button 65, is moved forwardly, the contact member thereon, closes the circuit against the terminal 71, thereby establishing a circuit from the source of E. M. F. 73, through wire 74, through the switch element, terminal 71, solenoid 29, thence by ground to electric alarm bell 58, through lamp 57, through motor 5, thence returning by wire 75, to the source of E. M. F. 73. Due to the energizing of the motor 5, the armature shaft will serve to drive the worm shaft 6, which serves to rotate the respective shafts 7 and 8, and the solenoid 29, being energized, the armature bar arm 28, will be attracted thereby, thus causing the yoke arm 26, to move the slidable clutch collar 20, into engagement with the clutch member 16, so that the clutch member will be driven with the shaft 7, and in a direction to tend to cause disengagement of the teeth on said clutch member with the notched hub of the cam wheel 12, thereby thrusting said cam wheel 12, outwardly against the compression of its spring 34, although not sufficiently outwardly to entirely disengage the cam wheel from the clutch member 16, so that the cam is caused to rotate with the clutch member. The outward movement of the cam wheel 12, however, will serve to cause the cam groove 42, to engage with the pin on the lower end of the arm 56, of the bell crank lever which operates the "stop" plate, and said pin tracking around in the groove 42, of the cam wheel, will swing the bell crank lever so that the arm 54, thereof, moves downwardly inwardly behind the rear edge of said "stop"

plate 49, and swings the same against gravity about the pivot 47, into upward position as shown in Fig. 5, and then as the rotation of the cam wheel 12, continues, the arm 56, with its pin tracking in the outer groove 43, of the cam wheel, will be given a periodic swinging or oscillating movement which will be transferred through the bell crank arm 54, to the stop plate, so that a waving movement from side to side of the plate will be caused. This operation causes the light 57, to burn and also rings the bell 58, and said operation will continue as long as the switch button 65 is maintained in the forward position in the switch on the steering wheel of the car.

When the switch button is moved into its central or neutral position, the current through the motor and solenoids will be broken, the bell 58 will cease to ring, the lamp 57 will go out, the solenoid 29 will be deënergized so that drive through the clutch member 16, will be disconnected, and the cam wheel 12, will spring inwardly under the compression of its spring 34, thus becoming disengaged from the pin on the lower end of the bell crank arm 56, and the bell crank being released, the arm 54, thereof, will be thrust outwardly as the stop plate 49, falls by gravity within the casing of the device.

The operation of the signal plate 48, and the signal arms 36 and 37, is accomplished in a similar manner which is believed to be clear from the drawings and the specification, said operation being performed by simply moving the switch button 65, rearwardly, or to the left or right for said respective plate 48, and arms 36 and 37. Whenever a signal arm or plate swings upwardly into signaling position the flange on the upper margin thereof opens the slot in the top of the casing and as a result a flood of light from the bulb 57, is cast upwardly on the surface of the signal plate or arm, effectively illuminating the same, so as to be clearly visible at night. It is obvious that the lamp of the device may be connected in an independent circuit so as to be used merely as a tail light if desired.

I am aware that various details of construction may be varied through a wide range without departing from the principles of this invention, and I therefore do not purpose limiting the patent granted otherwise than necessitated by the prior art.

I claim as my invention:

1. In an automobile signal device of the class described, a casing, signal plates and signal arms concealed therewithin, and cam controlled means for swinging the same into visible position outwardly from said casing and for imparting a waving motion thereto.

2. In a motor car signal device of the class described, signal arms adapted to be swung into visible position, electric means for driving the same to move the same into signaling position, cams associated therewith to impart a waving motion to said signal arms, and means mounted convenient for the operator of the motor car to close electric circuits to cause movement of said signal arms into signaling position.

3. In a mechanism of the class described a casing having a plurality of independent signaling devices concealed therein, electric motor driven clutch means for swinging the signaling devices positively into visible position, a cam associated with each of said signaling devices for imparting a continuous waving movement thereto, and means to control the electric circuits and operate the signaling devices.

4. In an automobile signal device of the class described, pivotally mounted signaling mechanisms normally concealed within the device adapted to be swung into visible position, electric clutch mechanisms for moving the signal mechanisms into visible position, cam wheels for imparting a waving movement thereto when the same are in signaling position, and selective means closing the electric circuits, to cause movement of any one of the desired signaling mechanisms into signaling position.

5. In an automobile signal device of the class described, a casing, a pair of signal plates and a pair of signal arms concealed therewithin, and clutch controlled cam means for swinging the same into visible position outwardly from said casing and to impart a waving motion thereto.

6. In a motor car signal device of the class described, a pair of independent signal arms adapted to be swung into visible position, bell cranks connected therewith, cams engaged thereby, electric means for driving either one of said cams to move one of said signal arms into signaling position and impart a waving movement thereto, and means mounted convenient for the operator of the motor car to close electric circuits to cause movement of said signal arms into signaling position.

7. In a mechanism of the class described a casing having a plurality of independent signaling devices concealed therein, electric motor driven means for swinging one of the same positively into visible position, a cam mechanism for imparting a continuous waving movement to said signaling device, and selective means to control the electric circuits to move and operate any one of the signaling devices.

8. In an automobile signal device of the class described, pivotally mounted signaling mechanisms normally concealed within the device and so mounted as to permit but one thereof to be swung into visible position at one time, grooved cam mechanisms connected therewith to impart an oscillating movement thereto when in display position, electric mechanisms for moving the signal mechanisms into visible positions, and selective means closing the electric circuits, to cause movement of any one of the desired signaling mechanisms into signaling position.

In testimony whereof I have hereunto subscribed my name in the presence of two subscribing witnesses.

RICHARD N. WOODMAN.

Witnesses:
    CHARLES W. HILLS, Jr.,
    EARL M. HARDINE.